H. H. LECLAIR.
RUNNER ATTACHMENT FOR VEHICLES.
APPLICATION FILED MAY 13, 1916.
1,225,444.
Patented May 8, 1917.
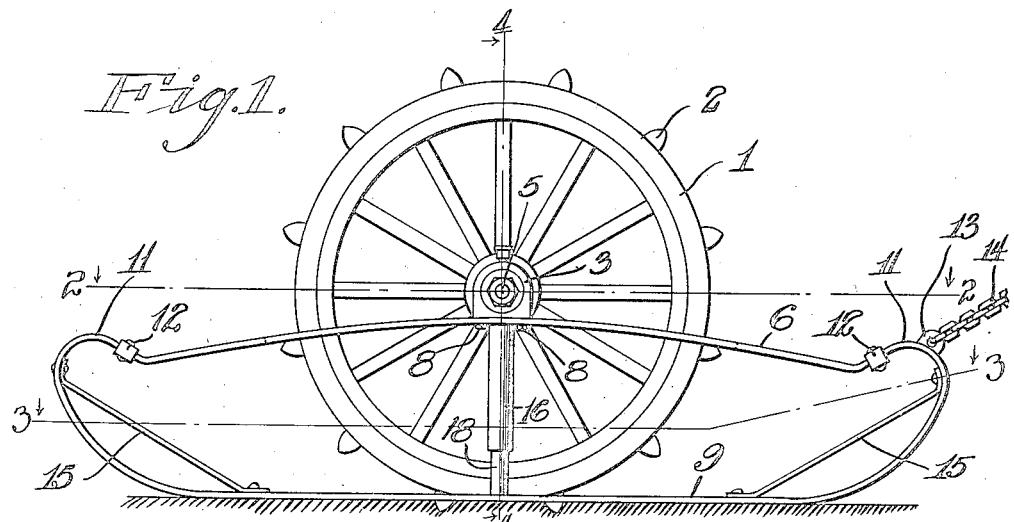
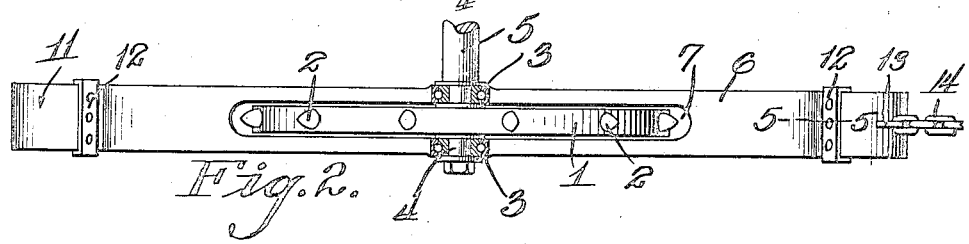
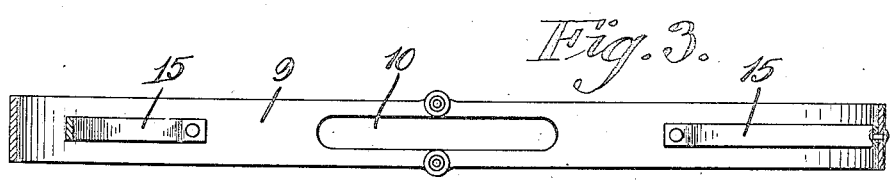
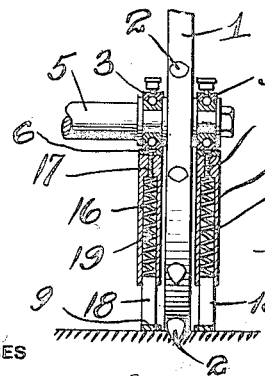
WITNESSES
Roland T. Williams
Wm. H. Milligan
INVENTOR
Henry H. Leclair
BY Richard Owen.
ATTORNEY

UNITED STATES PATENT OFFICE.

HENRY H. LECLAIR, OF LOWVILLE, NEW YORK.

RUNNER ATTACHMENT FOR VEHICLES.

1,225,444.      Specification of Letters Patent.      Patented May 8, 1917.

Application filed May 13, 1916. Serial No. 97,366.

*To all whom it may concern:*

Be it known that I, HENRY H. LECLAIR, a subject of the King of Great Britain, and a citizen of Canada, residing at Lowville, in the county of Lewis and State of New York, have invented certain new and useful Improvements in Runner Attachments for Vehicles, of which the following is a specification.

This invention relates to an attachment for converting an automobile or other auto vehicle into a sleigh and more particularly to a runner attachment which is adapted to be mounted on the axle of a vehicle for coöperating with the wheel of the vehicle whereby the vehicle may be used as a sleigh.

A further object of the invention is the provision of a runner which will be disposed upon the axle of a vehicle in a manner that will permit the wheel of the vehicle to propel the same while the runner gives the vehicle the necessary support by which it may be used as a sleigh.

As a further object the device contains a novel structure for mounting the runner upon the axle in a manner that will permit the easy and expeditious attachment of the device to the axle.

A further object of this invention is the provision of an automobile sleigh which consists of comparatively few parts and is simple in construction, but durable and well adapted to withstand the rough usage to which devices of this character are ordinarily subjected.

For a full description of the invention and the advantages and merits thereof, reference is to be had to the following description and the accompanying drawings, wherein is illustrated the preferred form of my invention, in which;

Figure 1 is a side elevation of the wheel of a vehicle showing the runner attached to the axle.

Fig. 2 is a horizontal transverse section on the line 2—2 of Fig. 1.

Fig. 3 is a horizontal transverse section on the line 3—3 of Fig. 1.

Fig. 4 is a vertical section on the line 4—4 of Fig. 1.

Fig. 5 is a detail section on the line 5—5 of Fig. 2.

The vehicle wheel 1 is provided with a plurality of circumferentially spaced sharpened studs or prongs 2 which are secured to the felly of the wheel and adapted to engage the snow or ice covered ground for propelling the vehicle. A bearing 3 is mounted on each side of the hub of the wheel and has the reduced portion 4 of an axle 5 extended through their center bores. The bearings 3 are provided with ball races in which a plurality of ball-bearings are mounted in the usual manner.

A flat spring 6 is provided with a central longitudinally extending slot 7 within which the wheel 1 is disposed and the center portion of the flat spring 6 is secured to the bearings 3 by the fastening bolts 8. A runner 9 is also provided with the central longitudinally extending slot 10 which is of a length less than the length of the slot 7 whereby the wheel may be extended through the runner for engagement with the ground. The ends of the runner are curved upwardly and are further curved toward the center of the runner as indicated at 11 so that the terminals of the runner may be connected to the terminals of the flat spring 6. The connecting terminals of both the flat spring 6 and the curved portions of the runner are provided with cut out portions whereby the terminals may be dovetailed together and fastened by a band 12. A plurality of bolts or rivets are extended through apertures in both the band 12 and the dovetailed portions for rigidly holding the terminals together as indicated by Fig. 5 of the drawing. An ear 13 is carried by the forward end of the runner and receives one end of a chain 14, the opposite end of which is fastened to any suitable point on the vehicle body for preventing the runner from pivotally swinging too far when it strikes an obstruction in the roadway. The runner is also provided with angularly disposed braces 15 secured to the runner at each end whereby the upwardly curved portion of the runner will be braced for preventing too great a resiliency when the body of the vehicle becomes weighted.

Beneath the center portions of the flat spring 6 and depending downwardly beneath the center of each of the bearings 3 is a cylinder 16 which is secured by fastening screws 17 to the flat spring 6. The bottom end of each of the cylinders 16 is open to receive the piston 18 secured to and extending upwardly from the runner 9. Interposed between the bottom of the central bore of the cylinders 16 and the piston 18 is a coil spring 19. By this construction it will be observed that an added resiliency to the wheel is provided in addition to that furnished by the flat spring 6.

By mounting the wheel so that the driving prongs 2 strike the ground centrally with respect to the longitudinal center of the runner, the device provides a means whereby the propelling power is imparted directly to the center of the runner thus preventing any binding of the structure while the vehicle is in motion.

In reduction to practice I have found that the form of my invention illustrated in the drawings and referred to in the above description, as the preferred embodiment, is the most efficient and practicable; yet realizing that the conditions concurrent with the adoption of my device will necessarily vary, I desire to emphasize the fact that various minor changes in the details of construction, proportion and arrangement of parts may be resorted to, when required, without sacrificing any of the advantages of my invention, as defined in the appended claims.

I claim:

1. The combination with a vehicle wheel and a shaft for the wheel, bearings mounted on said shaft at opposite sides of the wheel, a flat spring having a slot formed therein for the reception of the wheel, and a runner also provided with a slot for receiving said wheel, said runner and said flat spring being connected at their terminals.

2. The combination with a vehicle wheel and a shaft for the wheel, bearings mounted on said shaft at opposite sides of the wheel, a flat spring having a slot formed therein for the reception of the wheel, a runner also provided with a slot for receiving said wheel, said runner and said flat spring being connected at their terminals, and resilient means interposed between said runner and said flat spring.

3. The combination with a vehicle wheel and a shaft for the wheel, bearings mounted on the shaft at opposite sides of the wheel, a flat spring having a slot formed therein for the reception of said wheel, a runner also provided with a slot for receiving said wheel, the ends of the runner being curved upwardly and having its terminals bent toward each other and connected to the ends of said flat spring.

4. The combination with a vehicle wheel and a shaft for the wheel, bearings mounted on said shaft at opposite sides of the wheel, a flat spring secured to said bearings and provided with center longitudinally extending slot through which the wheel is disposed, a runner having curved end portions and its terminals secured to the terminals of said flat spring, said runners also provided with a slot through which said wheel extends, and brace members having their ends secured to said runners for bracing the curved portions thereof.

5. The combination with a vehicle wheel and a shaft for the wheel, bearings carried by said shaft at opposite sides of said wheel, a flat spring secured to said bearings, a runner having its terminals fastened to the terminals of said spring, a pair of cylinders depending from said flat spring and secured thereto, and resilient means connected to said runner and disposed within the central bores of said cylinders.

6. The combination with a vehicle wheel and a shaft for the wheel, bearings carried by said shaft at opposite sides of said wheel, a flat spring secured to said bearings, a runner having its terminals fastened to the terminals of said spring, a pair of cylinders depending from said flat spring and secured thereto, a pair of pistons secured to said runner and having their ends disposed within said cylinders, and a spring element carried by said cylinders and contacting with the ends of said pistons.

7. The combination with a vehicle wheel and a shaft for the wheel, a runner provided with an elongated slot for receiving the periphery of the wheel, and resilient supporting means interposed between the runner and the said shaft, including a cylinder disposed on each side of the said wheel.

8. The combination with a vehicle wheel and a shaft for the wheel, a runner having a longitudinal slot for the reception of the periphery of the wheel, the said shaft having bearings arranged at each side of the wheel and in close proximity thereto, and resilient means interposed between the runner and the said bearings and including a pair of vertically disposed cylinders, one of which depends from each of the said bearings.

9. The combination with a vehicle wheel and a shaft for the wheel, a runner, a flat spring having its ends connected to the runner and provided with a central slot for the reception of said wheel, and resilient means coöperating with the said flat spring for imparting additional resiliency to the said flat spring.

10. The combination with a vehicle wheel and a shaft for the wheel, a flat spring, a runner having its terminals fastened to the terminals of said spring, the portion of the said flat spring intermediate its ends being connected to the said shaft, pistons secured to the said runner on opposite sides of the said wheel, and resilient means interposed between the said flat spring and the ends of said piston.

11. The combination with a vehicle wheel and a shaft for the wheel, bearings mounted on the shaft at opposite sides of the wheel, a runner provided with an elongated slot for receiving the said wheel, the said wheel being circumferentially alined with the longitudinal center line of the said runner whereby the said bearings will be disposed vertically above the side edges of the said runner, vertically disposed pistons rigidly fixed to the said runner at opposite sides thereof and in perpendicular alinement with the said bearings, and resilient means interposed between the said bearings of each of the said pistons.

12. The combination with a vehicle wheel and a shaft for the wheel, bearings mounted upon the shaft at opposite sides of the wheel and in close proximity thereto, a runner provided with an elongated slot for receiving the said wheel, the ends of the said runner being curved upwardly and toward the center of said wheel, a flat spring provided with an elongated slot and having its portions at the opposite sides of the said slot fastened to the said bearings, the proximate ends of the said runner being fastened to the terminals of the said flat spring, and a resilient member interposed between the flat spring and the said runner at opposite sides of the said wheel.

In testimony whereof I affix my signature in presence of two witnesses.

HENRY H. LECLAIR.

Witnesses:
 GEORGE R. COOK,
 C. TRAY MOORE.